Aug. 9, 1932.  C. A. CAMPBELL  1,871,111
AIR CLEANER
Filed Oct. 9, 1930  2 Sheets-Sheet 1

Inventor
Charles A. Campbell
By Dodge and Son
Attorneys

Aug. 9, 1932.   C. A. CAMPBELL   1,871,111
AIR CLEANER
Filed Oct. 9, 1930   2 Sheets-Sheet 2

Inventor
Charles H. Campbell
By Dodge and Sons
Attorneys

UNITED STATES PATENT OFFICE

CHARLES A. CAMPBELL, OF WATERTOWN, NEW YORK, ASSIGNOR TO THE NEW YORK AIR BRAKE COMPANY, A CORPORATION OF NEW JERSEY

AIR CLEANER

Application filed October 9, 1930. Serial No. 487,616.

This invention relates to air cleaners, and the principal object of the invention is to combine the advantages of a separator, of the vortex type, with an air filter. The air passes first through the separator and there gives up approximately three-fourths of the dust particles carried thereby. The vortex separator is particularly effective on the larger particles, but is not so effective with fine particles. These fine particles are intercepted by the filter.

Another feature of importance is that the filter is of the cartridge type, and may be withdrawn as a unit. Further, a flaring deflector, forming a part of the vortex separator, and removable therefrom, is made to serve both as a retainer for the filter cartridge and as a receiver for fine dust which will discharge from the lower part of the filter cartridge as a result of vibration. This dust is retained out of the path of air flow. In this way the filter element is at least partially self-cleaning.

A preferred embodiment of the invention is illustrated in the accompanying drawings, in which,—

Figure 1:
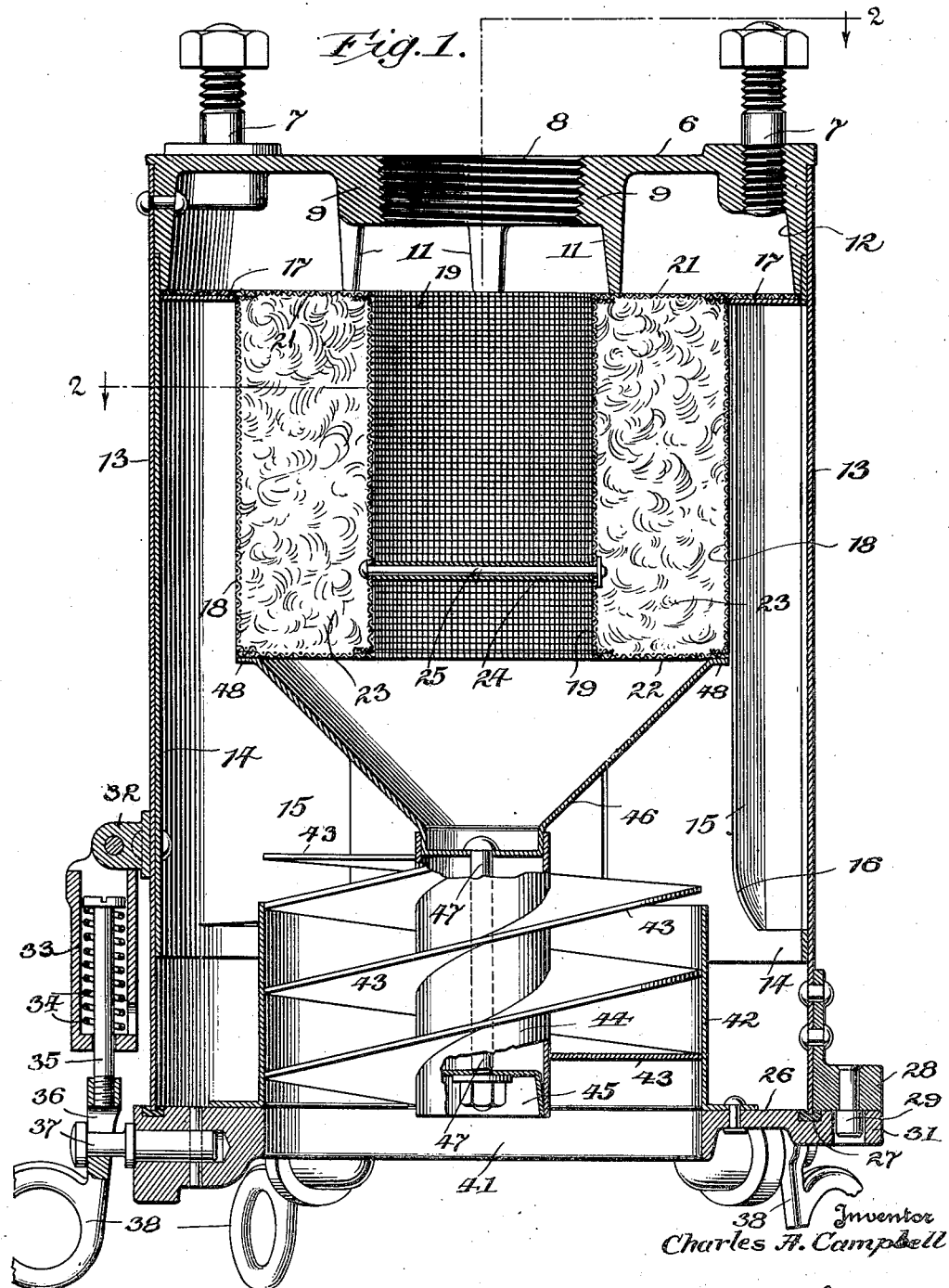
Fig. 1 is a view in vertical section, the plane of section being indicated by the line 1—1 on Fig. 2.

The entire structure is supported by a head 6 provided with studs 7 by which the head is attached to any suitable support. The head is formed with a central threaded discharge port 8 through which the cleaned air leaves the device. This threaded port is formed in a thickened boss 9 and from this boss there project downwardly a plurality of positioning fingers 11 which limit the insertion of the filtering cartridge, hereinafter described.

Figure 2:
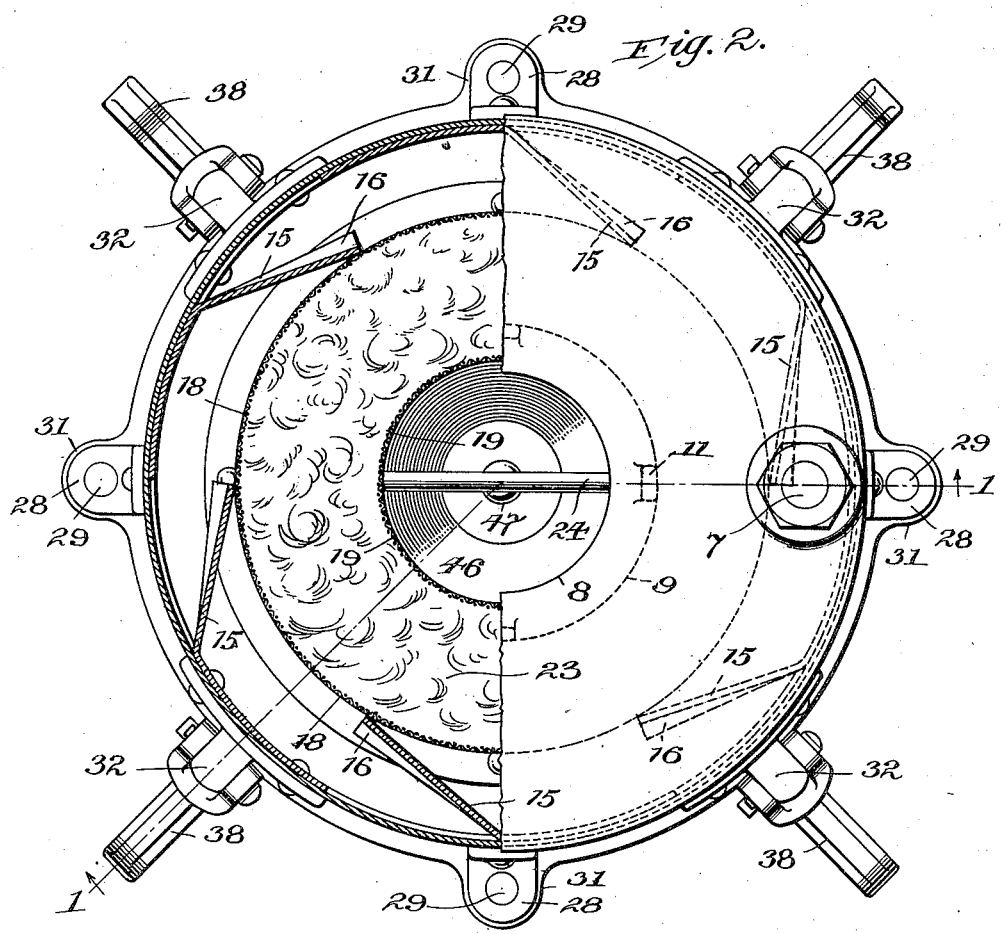
Fig. 2 is a view of the complete separator, half in plan, and half in section, on the line 2—2 of Fig. 1.

The head 6 is formed with a peripheral flange 12, to which is riveted an encircling shell or casing 13. This shell is open at its lower end. Fitting closely within the shell 13 is a second shell 14, shorter in length, from which are struck inward a plurality of longitudinal vanes or baffles 15. These baffles project obliquely inward, as clearly shown in Fig. 2, and at their lower corners are bent outward slightly, as indicated at 16, to facilitate insertion of the filter cartridge.

The lower ends of the baffles are a substantial distance above the lower end of the shell 13. The upper ends are slightly below the plane of the ends of the lugs 11 and the ends are lapped or blinded by an annular plate 17 which seats on the ends of the baffles. Overlying, and spot welded to the annulus 17 is a foraminous disc 21. This seats against the lower ends of lugs 11 and the lower margin of flange 12.

The filter cartridge is embraced frictionally by the baffles 15, and preferably, is of circular form, though any hollow or annular form might be substituted, if desired. It is made up of an annular shell 18, of foraminous material, preferably woven wire cloth, a similar smaller annular shell 19 of foraminous material, and an annular foraminous bottom 22. The space between the shells 18 and 19 is filled with filtering material 23, preferably material of a fibrous character, such as curled hair. This is removable for cleaning when the shell structure has been withdrawn. A spacing tube 24, encircling a rivet 25, serves as means for withdrawing the cartridge from the casing.

The lower end of the shell 13 receives a head or closure 26. This is provided with a gasket 27 seated in a groove in the head and so located as to seal against the lower margin of the shell 13. The shell 13 is provided at its lower margin with a plurality of lugs 28, four being shown. Each lug carries a stud 29.

The closure 26 is provided with corresponding apertured ears 31, so that the studs 29 and ears 31 cooperate to position the closure 26 on the lower end of the shell 13. It is retained in place by a plurality of releasable clamps, four being shown. These clamps may assume various forms. Those shown in the drawings comprise a lug 32, riveted to the shell 13, a spring barrel 33 hinged thereto, a spring 34 in the barrel, a headed plunger 35 longitudinally slidable in the barrel and arranged to compress the spring as the plunger is withdrawn from the barrel, and an eye 36 which may be slipped over a corresponding headed stud 37 on the closure 26.

Each of the plunger members 35 terminates in a finger ring 38, by which it may be manipulated.

The closure 26 is formed with a central aperture 41, bounded by an upstanding wall 42, whose diameter is substantially that of the aperture 41. The parts are so dimensioned that the upper margin of the wall 42 is slightly above the lower ends of the baffles 15. The wall 42 is positioned radially inward a slight distance from the inner edges of the baffles 15, the purpose being to afford between the wall 22 and the lower portion of the shell 13, an annular pocket which will collect dust particles arrested and guided out of the air stream by the baffles 15.

Connected at their peripheries to the wall 42 are two spiral vanes 43, designed to impart to air entering the passage 41, a rapid whirling motion. Any number and various forms of blades might be used to accomplish this purpose, but the structure shown has proved to be satisfactory in service. The vanes 43 are also connected to a tubular hub 44, which is closed at its lower end by a flanged plug 45. At its upper end it receives a cup-like flaring deflector 46 which has a portion entering the upper end of the tubular hub 44 and connected with the cup member 45 by a tension bolt 47.

The deflector 46 is formed with a peripheral flange 48 which seats on the lower wall 22 of the filter element adjacent the outer periphery thereof.

The parts are so dimensioned that when the filter cartridge seats against the lugs 11 and annular plate 17 and the closure 26 is in position, the flange 48 will seat and seal against the lower end of the filter cartridge as shown.

It will be observed that the whirling motion imparted to the entering air by the guides 43, is of such direction that the whirling air passing up along the deflector 46, will enter pockets formed by the baffles 15, the baffles being presented edgewise to the whirling air. It follows that the larger dust particles will be thrown into the narrow portion of these pockets and will flow down to the bottom of the casing 13 and collect in the space outside the wall 42. Any fine dust particles not arrested by the baffles 13, as just described, will pass radially inward into the filter element and be arrested by the filtering medium. The tendency therefore is for the filtering medium to accumulate fine particles of dust, but vibration incident to the operation of the compressor, or to the motion of the vehicle on which the device is used, will cause the fine particles to gravitate to the bottom of the filtering element and through the foraminous wall 22 into the upper cup-like recess formed by the flaring deflector 46. This recess is wholly out of the path of air flow through the filter, and, consequently, there is no tendency for this dust to be entrained in the out-flowing air. In this way the filter element is rendered self-clearing to a considerable extent.

To clean the device, the closure 26 is released and drawn downward, taking with it the wall 42, spiral guides 43 and deflector 46. The filter unit will be retained frictionally by the baffles 15. After the dust within the baffle 46 and outside the wall 42 has been disposed of, the parts may be replaced, though ordinarily it is advisable to withdraw the filter unit and either clean this or substitute a clean filter for it.

The device has decided utility as applied to the suction intakes of air brake compressors, used in railway service. The vortex separator disposes of most of of the dirt, particularly the larger and more abrasive particles. It also eliminates considerable moisture, under certain conditions. Both these characteristics are desirable, as the removal of the large abrasive particles reduces the wear and tear on the filter element, and the removal of part of the moisture, reduces the tendency of the filter element to clog. If any considerable amount of moisture passes into the filter, its ability to clear itself of fine particles by vibration is impaired.

Curled hair strainers have heretofore been used on air brake compressors and have been subject to frequent destruction incident to the careless use of torches by the engine men. If a torch be brought near the air cleaner intake the flame will be drawn into the hair filter and cause its destruction. The use of the vortex separator in advance of the hair strainer offers substantial protection against the occurrence of such an accident.

While I have described the invention in considerable detail, and while I prefer the particular embodiment set forth, various embodiments are obviously possible, and are contemplated within the scope of the following claims.

What is claimed is,—

1. In an air cleaner, the combination of a casing having an inlet and a discharge; means associated with the inlet for imparting a whirling motion to entering air; a plurality of longitudinally extending baffles directed inwardly from said casing and between which said whirling air is projected; and an annular strainer element embraced by a portion of said baffles and in the path of flow from the baffles toward said discharge.

2. In an air cleaner, the combination of a casing having an inlet and a discharge; means associated with the inlet for imparting a whirling motion to entering air; a plurality of longitudinally extending baffles directed inwardly from said casing and in directions opposed to the whirling motion of the entering air said baffles being so located that the whirling air enters between them; and an annular strainer element embraced by a portion of said baffles and in the path of flow from the baffles toward said discharge.

3. In an air cleaner, the combination of an upright cylindrical casing having a central bottom inlet and a top discharge; means associated with said inlet for imparting a whirling motion to entering air; a plurality of substantially vertical baffles directed inwardly from said casing and in directions opposed to the whirling motion of said entering air, said baffles being so located that the whirling air enters between them; means for isolating the upper ends of said baffles from said discharge; and an annular strainer element embraced by a portion of said baffles and open at its interior to said discharge.

4. In an air cleaner, the combination of a casing having a bottom inlet and a top discharge; means associated with said inlet for imparting a whirling motion to entering air; a plurality of substantially vertical baffles directed inwardly from said casing and in directions opposed to the whirling motion of said entering air; means for isolating the upper ends of said baffles from said discharge; and an annular strainer element having two foraminous concentric shells, and a fibrous filling, said strainer element being embraced by the upper portions of said baffles and open at its interior to said discharge.

5. In an air cleaner, the combination of a casing having an inlet and a discharge; means associated with said inlet for imparting a whirling motion to entering air; a plurality of baffles directed inwardly from said casing and in directions opposed to the whirling motion of said entering air; means for isolating from said discharge the ends of said baffles adjacent said discharge; an annular strainer element having two foraminous concentric shells, and a fibrous filling, said strainer element being embraced by a portion of said baffles and open at its interior to said discharge; and a flaring deflector interposed between said whirling motion imparting means and said strainer element, said deflector on its lower side serving to direct air to the spaces between said baffles and on its upper side underlying said strainer element and serving to collect out of the path of air flow solid particles gravitating from said strainer element.

6. The combination defined in claim 5, further characterized in that the strainer element is withdrawable as a unit and the deflector and means for imparting whirling motion are withdrawable and serve to retain the strainer element in place.

7. The combination defined in claim 5, further characterized in that the strainer element is withdrawable as a unit, and the deflector, means for imparting whirling motion, and a portion of the casing, are removable as a unit and serve to retain the strainer element in place.

8. The combination of a vortex separator having a vortex chamber and having dust arresting baffles mounted in and extending beyond said chamber; and an annular strainer encircled and closely embraced by said extending portion of said baffles, and interposed in the path of inward flow therefrom.

9. The combination of a vortex separator, including a casing having an inlet and an outlet, a flaring deflector and an annular series of substantially vertical dust arresting baffles encircling and projecting above the same; and an annular strainer composed of spaced concentric annular foraminous shells and an air straining filling, said strainer being embraced by the upper portions of said baffles and overlying said deflector.

10. In an air cleaner, the combination of a casing open at its lower end; a plurality of blade-like baffles projecting inward part way from said casing; a filtering unit insertible and removable into and from the space within said baffles through the open lower end of said casing, said unit being frictionally gripped by said baffles and including a foraminous shell, and a porous filling within said shell; and a removable closure for the lower end of said casing, said closure having means for positively retaining said filter unit in position.

11. In an air cleaner, the combination of a casing; a plurality of blade-like baffles projecting inward part way from said casing and extending longitudinally of the casing, the ends of said baffles being formed to offer a flaring entrance to the space within said baffles; and a filtering unit insertible and removable in the direction of the length of said baffles into and from the space within said baffles, said unit being frictionally gripped by said baffles and including inner and outer foraminous shells, and a porous filling between the shells.

12. In an air cleaner, the combination of a shell having a discharge connection at its top and an open bottom; a removable closure for said bottom having a central inlet passage materially smaller than the bottom, and an upstanding wall surrounding said inlet passage; inclined air guides mounted in said inlet passage and adapted to impart a whirling motion to entering air; baffles extending inward from said shell and overlying the interval between said wall and said shell; a removable annular filtering element within said baffles; and a flaring deflector carried by said bottom, interposed between said air guides and said filtering element and engaging the lower outer periphery of said filtering element to support the latter.

13. The combination of claim 12, further characterized in that the wall, air-guides, and deflector, are connected with the bottom and are removable therewith as a unit, and that the filtering element engages and is frictionally sustained by the baffles.

In testimony whereof I have signed my name to this specification.

CHARLES A. CAMPBELL.